US010797942B2

(12) United States Patent
Khambatkone et al.

(10) Patent No.: US 10,797,942 B2
(45) Date of Patent: Oct. 6, 2020

(54) PROVISIONING NETWORK SERVICES FOR CABLE SYSTEMS

(71) Applicant: Gainspeed, Inc., Sunnyvale, CA (US)

(72) Inventors: Alok Khambatkone, San Jose, CA (US); Bhupesh Kothari, San Jose, CA (US); Iswar Biswal, Campbell, CA (US); Binoy Dash, Sunnyvale, CA (US); Chao Wang, Sunnyvale, CA (US); Philip Winterbottom, San Jose, CA (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 52 days.

(21) Appl. No.: 15/005,312

(22) Filed: Jan. 25, 2016

(65) Prior Publication Data

US 2016/0294611 A1    Oct. 6, 2016

Related U.S. Application Data

(60) Provisional application No. 62/141,826, filed on Apr. 1, 2015.

(51) Int. Cl.
*H04L 12/24* (2006.01)
*H04L 12/28* (2006.01)
(Continued)

(52) U.S. Cl.
CPC ...... *H04L 41/0803* (2013.01); *H04L 12/2801* (2013.01); *H04L 41/5054* (2013.01);
(Continued)

(58) Field of Classification Search
CPC . H04L 41/0803; H04L 12/2801; H04L 67/10; H04L 67/125; H04L 41/5054
See application file for complete search history.

(56) References Cited

U.S. PATENT DOCUMENTS 6,393,478 B1 * 5/2002 Bahlmann ............... H04L 41/22
709/224
6,516,355 B1 2/2003 Hartmann et al.
(Continued)

OTHER PUBLICATIONS

PCT/US2016/025374, Mar. 31, 2016 (filing date), Gainspeed, Inc.
International Search Report and Written Opinion of PCT/US2016/025374, dated Jun. 23, 2016, Gainespeed, Inc.

*Primary Examiner* — Jeffrey M Rutkowski
*Assistant Examiner* — Chae S Lee
(74) *Attorney, Agent, or Firm* — Loza & Loza, LLP; Jessica W. Smith

(57) ABSTRACT

A novel method for provisioning network services for a cable system is provided. The method provides a configuration command interpreter/compiler that receives configuration commands of the cable system and generates configuration commands understood by the actual physical devices implementing the cable system. The interpreter transforms the configuration commands of the cable system into the configuration commands of the actual physical devices based on a set of normalized data models describing the cable system. The normalized data models are applicable to the cable system regardless of the actual devices implementing the cable system. The normalized data models are specified using normalized parameters that are generally applicable to different types devices that can be used to implement the cable system.

21 Claims, 9 Drawing Sheets

(51) Int. Cl.
*H04N 21/6338* (2011.01)
*H04N 21/61* (2011.01)
*H04N 21/6547* (2011.01)

(52) U.S. Cl.
CPC ..... *H04N 21/6118* (2013.01); *H04N 21/6338* (2013.01); *H04N 21/6547* (2013.01); *H04L 41/509* (2013.01)

(56) References Cited

U.S. PATENT DOCUMENTS

| | | |
|---|---|---|
| 6,795,846 B1 | 9/2004 | Merriam |
| 8,041,782 B1 | 10/2011 | Crow et al. |
| 8,935,739 B1 | 1/2015 | Rakib |
| 2002/0171762 A1 | 11/2002 | Maxson et al. |
| 2003/0074430 A1 | 4/2003 | Gieseke et al. |
| 2004/0230681 A1* | 11/2004 | Strassner ............... G06Q 10/10 709/226 |
| 2004/0261116 A1* | 12/2004 | Mckeown ........... H04L 12/2801 725/109 |
| 2010/0067407 A1 | 3/2010 | Bowen et al. |
| 2010/0071020 A1* | 3/2010 | Addington ............. H04H 20/78 725/132 |
| 2010/0162378 A1 | 6/2010 | Jayawardena et al. |
| 2011/0131398 A1* | 6/2011 | Chaturvedi ......... H04L 41/0813 713/1 |
| 2012/0291084 A1 | 11/2012 | Rakib |
| 2012/0317248 A1 | 12/2012 | Larky et al. |
| 2014/0122874 A1 | 5/2014 | Janakiraman et al. |
| 2015/0271268 A1* | 9/2015 | Finkelstein ............. H04L 67/12 370/400 |
| 2016/0094402 A1* | 3/2016 | Finkelstein ......... H04L 41/0803 709/226 |
| 2017/0041203 A1* | 2/2017 | Huuhtanen ............ G06Q 10/00 |

* cited by examiner

```
aset ccap protocols igmp cable-bundle-all
version 3
set ccap protocols igmp cable-bundle-all group-
limit 50
commit
```
                                                  494

```
set protocols igmp interface ae0.16383 version 3
set protocols igmp interface ae0.16383 group-
limit 50
commit
```
                                              492

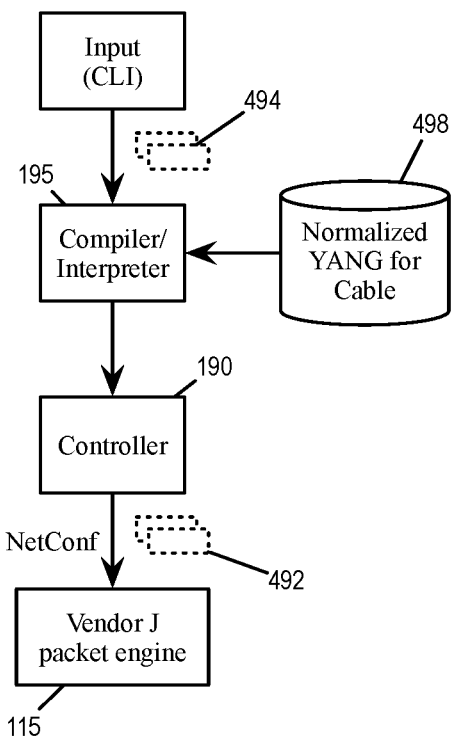

```
augment /cpxy:ccap/cpxy:protocols {
      container igmp {
      presence "enable igmp";
      tailf:info "IGMP options";
      tailf:callpoint chg-protocols {
          tailf:transaction-hook subtree;
      }
      uses routing-protocols-igmp;
   }
}
grouping routing-protocols-igmp {
      container cable-bundle-all {
        presence "";
        ymap:j-pathmap "/protocols/igmp/
interface{ae0.16383}";

tailf:info
           "Global cable bundle access options for
IGMP";

must "promiscuous-mode" {
           error-message "promiscuous-mode
must be set for global cable bundle access";
                   tailf:dependency "promiscuous-
mode";
        } leaf promiscuous-mode {
        tailf:info
            "Accept IGMP messages coming
from different subnet";
             type empty;
      }
      uses igmp-interface-options;
      } grouping igmp-interface-options {
      choice choice-3 {
        leaf disable {
           tailf:info "Disable IGMP on this
interface";
             type empty;
        }
      }
      leaf version {
        tailf:info "Set IGMP version number on this
interface";
           type uint8 {
             range "1 .. 3";
           }
        }
```
                                              498a

*Figure 4a*

```
    container static {
        tailf:info "Static group or source
membership";
        list group {
            key "name";
            ordered-by user;
            tailf:info "IP multicast group address";
            leaf name {
                tailf:info "IP multicast group address";
                type ipv4addr;
            }
            leaf group-increment {
                type ipv4addr;
                tailf:info "Mask for the incrementing
group IP address";
            }
            leaf group-count {
                tailf:info "Number of groups";
                type uint32 {
                    range "1 .. 512";
                }
            }
            leaf exclude {
                tailf:info "Exclude sources";
                type empty;
            }
            list source {
                key "name";
                ordered-by user;
                tailf:info "IP multicast source
address";
                leaf name {
                    tailf:info "Source address of IP
multicast data";
                    type ipv4addr;
                }
                leaf source-increment {
                    type ipv4addr;
                    tailf:info "Mask for the
incrementing source IP address";
                }
                leaf source-count {
                    tailf:info "Number of sources";
                    type uint32 {
                        range "1 .. 1024";
                    }
                }
            }
        }
    }
```
498b

Figure 4b

```
a leaf ssm-map {
        type string;
        tailf:info "Map for SSM translation of
IGMPv1 or IGMPv2 messages";
    }
    leaf immediate-leave {
        tailf:info "Group is removed immediately
without sending query for last membership";
        type empty;
    }
    leaf accounting {
        tailf:info "Enable join and leave event
notification";
        type empty;
    }
    leaf no-accounting {
        tailf:info "Don't enable join and leave event
notification";
        type empty;
    }
    leaf-list group-policy {
        type policy-algebra;
        ordered-by user;
        tailf:info "Group filter applied to incoming
IGMP report messages";
    }
    leaf group-limit {
        tailf:info "Maximum number of
(source,group) per interface";
        type uint16 {
            range "1 .. 32767";
        }
    }
    container passive {
        presence "enable passive";
        tailf:info "Suppress sending and receiving
IGMP messages";
        leaf allow-receive {
            tailf:info "Allow receiving IGMP
messages";
            type empty;
        }
        leaf send-general-query {
            tailf:info "Send IGMP general query
messages";
            type empty;
        }
        leaf send-group-query {
            tailf:info "Send IGMP group query
messages";
            type empty;
        }
    }
}
```
498c

PROVISIONING NETWORK SERVICES FOR CABLE SYSTEMS

The present Application claims the benefit of U.S. Provisional Patent Application 62/141,826, filed Apr. 1, 2015. U.S. Provisional Patent Applications 62/141,826 is incorporated herein by reference.

BACKGROUND

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal. With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard was built upon this analog and digital TV foundation, and specified additional standards to provide broadband Internet services (Internet protocols, or IP), voice over IP, custom video on demand, and other modern services based upon the QAM data transmission waveforms previously established for digital and high definition television.

As a result, simple coaxial cables have been gradually upgraded to accommodate ever-increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit. By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data. This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

Optical fiber technology has been widely used for high capacity computer networks, and these networks often do not use the DOCSIS protocols or QAM protocols to transmit data. Rather, these high capacity computer networks often use entirely different types of data transmission protocols, such as the Ethernet protocols IEEE 802.3ah, 1000 BASE-LX10, 1000 Base-BX10, and others. These networks and protocols are often referred to as GigE networks, which is an abbreviation of the Gigabyte speeds and Ethernet protocols used for fiber based computer network. Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video—on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system, to be further extended to meet the ever-growing demands for additional data.

SUMMARY

Some embodiments of the invention provide a novel method for provisioning network services for a cable system. The method provides a configuration command interpreter/compiler that receives configuration commands of the cable system and generates configuration commands understood by the actual physical devices implementing the cable system. The interpreter transforms the configuration commands of the cable system into the configuration commands of the actual physical devices based on a set of normalized data models describing the cable system. The normalized data models are applicable to the cable system regardless of the actual devices implementing the cable system. In some embodiments, the normalized data models are specified using normalized parameters that are generally applicable to different types devices that can be used to implement the cable system.

In some embodiments, some of the normalized data models are for describing network services being provided to users/subscribers of the cable system. Specifically, in some embodiments, the cable system includes a packet engine for providing the network services, and the normalized data models includes descriptions of the network services that are used by the configuration command interpreter to generate configuration commands for the packet engine, regardless of the actual device that is deployed to serve as the packet engine.

In some embodiments, the cable configuration commands and the normalized data models are for provisioning network services in the cable system. Specifically, cable configuration commands are for configuring the cable system to provide network services such as L2 switching, L3 routing, edge routing, DHCP, firewall, etc. These services allows the cable system to operate a IP network, whose data packets used by the cable system to provide cable services such as Set Top Box, Voice over IP, Internet Access, etc. In some embodiments, some or all of the network services are provided by the packet engine or provided through the packet engine, and the cable configuration commands are interpreted into device configuration commands for configuring the packet engine to provide these services.

The normalized data models are for describing the cable system and for describing the network that the cable system is implementing. In some embodiments, the normalized data models include data models for cable constructs such as cable bundles. In some embodiments, the normalized data models include network constructs such as routing protocols (e.g., protocols such as BGP, RIP, etc.).

In some embodiments, the data models are arranged in a hierarchical manner. A data model of a cable construct can be the root of a tree of data models that include data models of network services required to implement cable constructs. In some embodiments, a service-provisioning request based on hierarchical data models would initiate a hierarchical transaction where the service instance is a parent transaction that fires off child transactions for every device. A provisioning request for a cable system construct based on such normalized data models would thus automatically trigger transactions across the entire hierarchy of the cable system construct. These triggered transactions across the hierarchy in turn generate the corresponding configuration commands.

Some embodiments provide a debugger tool that automatically exercise the normalized data models and flush the errors that would result in erroneous device configuration commands. The debugging tool examines the normalized data models and generates debugging cable configuration commands for the compiler. In some embodiments, the debugging tool examines the normalized data models to identify transactions that perform specific device mapping. For each of these identified transactions, the debugging tool generates corresponding debug cable configuration commands. These corresponding debug cable configuration commands are to ensure that the device mapping syntax are properly exercised in order to flush out errors.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 4a-b illustrates an example normalized YANG for a cable system and a corresponding L3 service-provisioning request.

DETAILED DESCRIPTION

Figure 1:
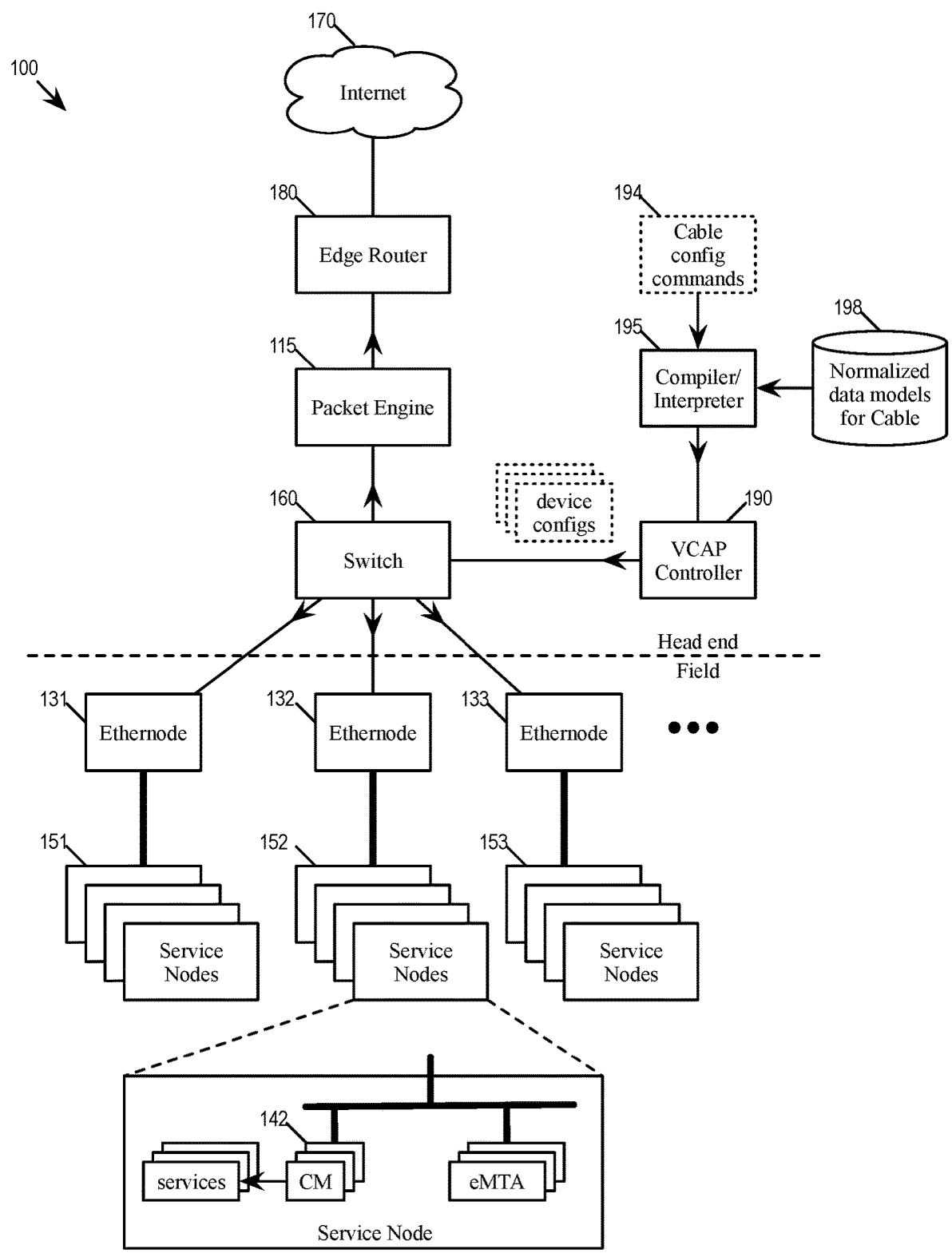
FIG. 1 illustrates a cable system that includes a packet engine for handling the IP/Ethernet traffic of the cable system.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a novel method for provisioning network services for a cable system. The method provides a configuration command interpreter/compiler that receives configuration commands of the cable system and generates configuration commands understood by the actual physical devices implementing the cable system. The interpreter transforms the configuration commands of the cable system into the configuration commands of the actual physical devices based on a set of normalized data models describing the cable system. The normalized data models are applicable to the cable system regardless of the actual devices implementing the cable system. In some embodiments, the normalized data models are specified using normalized parameters that are generally applicable to different types devices that can be used to implement the cable system.

In some embodiments, some of the normalized data models are for describing network services being provided to users/subscribers of the cable system. Specifically, in some embodiments, the cable system includes a packet engine for providing the network services, and the normalized data models includes descriptions of the network services that are used by the configuration command interpreter to generate configuration commands for the packet engine, regardless of the actual device that is deployed to serve as the packet engine.

I. VCAP/DCMS Cable System

In some embodiments, the cable system is a virtualized CCAP (VCAP) system. Unlike a conventional CCAP system in which the cable head end is a cable modem termination system (CMTS) device that directly provides modulated RF signals through CATV cables to the cable modems, a VCAP system uses remote distribution nodes in the fields (remote from the central office) to handle all of the RF communications with cable modems in a distributed fashion. This leaves the central cable head end to be an all-IP/all-Ethernet hub, and the packet engine of the cable system is in some embodiments located at the cable head end for handling the IP/Ethernet traffic. Such a cable system is therefore also referred to as a distributed cable management system (DCMS). In some embodiments, the remote distribution nodes distribute the functionality of the CMTS device out into the field as if the line cards of the CMTS are remotely located in the individual neighborhoods so that the CATV cables need not run all the way to the cable head end to receive the cable RF signals. Consequently, the remote distribution nodes are also referred to as Cable Modem Remote Termination System (CMRTS) devices in some embodiments.

FIG. 1 illustrates a cable system 100 that includes a packet engine 115 for handling the IP/Ethernet traffic of the cable system. The cable system and the packet engine are configured by device-specific configuration commands that are generated from normalized data models describing the cable system 100. As illustrated, the cable system 100 is a VCAP or DCMS system that has devices deployed in its head end and in the fields. Specifically, the head end includes the packet engine 115, a controller 190, an edge router 180, and a packet switch 160, while the field includes remote distribution nodes 131-133, and subscriber nodes 151-153. In some embodiments, the edge router 180, the packet engine 115 and the switch 160 are located within one facility (i.e., the headend of the cable system), while the remote distribution nodes 131-133 and the subscriber nodes (or service nodes) 151-153 are in remote locations (collectively referred to as the "field" in some embodiments). In some embodiments, the switch 160, the packet engine 115, and the edge router 180 are each implemented by a set of one or more devices, and therefore can be referred to as a set of switches, a set of packet engines, and a set of edge routers, respectively.

The cable system 100 provides many different types of services (such as Internet access, analog television channels, digital television channels, on-demand channels, voice over IP, DOCSIS channels, etc.) to subscriber nodes 151-153 at many different locations. The distributed architecture of this system is designed such that it can provide the service nodes with high-speed data for the desired services in a scalable, cost effect manner.

The edge router 180 connect the packet engine 115, and thereby the switches 160, the remote distribution nodes 131-133 and subscriber nodes 151-153, to the Internet 170. The edge routers handle north-south data packet traffic out of and into the DCMS 100. The packet engine 115 is responsible for routing packets to and from the devices 142 at the subscriber nodes 151-153 through the switches 160 and the remote distribution nodes 131-133. Each packet engine has limited number of input ports, which may not be able to accommodate traffic for a far greater number of remote distribution nodes for which the packet engine is responsible. Hence, the switch (or the set of switches) 160 is inserted between the packet engine and its associated set of remote distribution nodes. Different embodiments use different techniques to direct packets to, and from, a remote distribution node from, and to, the packet engine 115 through the switch 160. Several methods for mapping the interfaces of packet engines and switches to each other and to service flows at the remote distribution nodes are described in concurrently filed U.S. patent application Ser. No. 15/005,219, entitled "Mapping Cable Service Flows to IP Networks", concurrently filed U.S. patent application Ser. No. 15/005,242, entitled "Assigning QoS to Cable Service Flows", and concurrently filed U.S. patent application Ser. No. 15/005,261, entitled "Selective Configuration of Packet Engine for Cable Service Flows".

Each remote distribution node connects multiple subscriber nodes to the cable headend of the DCMS 100. The subscriber nodes that are serviced by one remote distribution node are typically within one contiguous geographic region. In some embodiments, a subscriber node represents a subscriber of cable services. Such a subscriber can be a household, an apartment, an office, etc. A subscriber node is also therefore also referred to as a service node in some embodiments. A service node includes one or more cable modems 142 for receiving and transmitting cable signals on its neighborhood CATV cable.

A cable modem 142 at a service node 151-153 in turn translates the received cable signals into data for subscribing devices 142 (e.g., set top box (STB), customer premise equipment (CPE), computers, handheld devices, multimedia terminal adapter (MTA), etc.) or for subscribed cable services (e.g., video on demand, voice over IP, etc.). In some embodiments, some of the subscribing devices have their own modems for directly receiving the subscribed services, such as an embedded MTA (eMTA).

In some embodiments, each remote distribution node 131-133 communicatively (1) connects to the switch 160 through one or more fiber optic cables to exchange digital data packets, and (2) connects to numerous service nodes (e.g., tens to hundreds of service nodes) through CATV cables to exchange radio frequency (RF) modulated signals. In some embodiments, each remote distribution node is an Ethernode (EN) that is associated with a MAC address, enabling a switch to direct to the EN the packets that are address to it and forward packets that are sent by the EN. This distributed architecture of system 100 is referred to as a remote MAC and PHY architecture because the in-the-field ENs that service multiple service nodes are MAC addressable, receive digital data packets, and perform the physical layer conversion to convert the digital data packets to RF signals in the field.

Each EN in some embodiments converts data packets from the cable head end into a DOCSIS compliant RF signal that are to be processed by DOCSIS compliant cable modems at the service nodes. In some embodiments, an EN strips the header information of the downstream IP packets it receives and delivers only the payload to the cable modem through the CATV cable. In other embodiments, an EN transmits the downstream IP packets in their entirety (header and payload) to the CATV cable. In some embodiments, the payloads of IP packets are digitized samples of RF waveforms, and the EN uses the digitized samples to reconstitute the RF waveform over the CATV cable. In some embodiments, the payloads of IP packets are QAM symbols, and the EN sends RF waveforms that are QAM modulated according to the received QAM symbols.

The controller 190 defines the operation of the DCMS or VCAP cable system 100 by configuring the operations of the packet engine 115, the switch 160, and the remote distribution nodes 131-133. In some embodiments, the controller sends control plane packets to their intended target devices through the packet switch 160, which can forward the control plane packet to their rightful destinations through one of its ports. As such, the controller 190 is able to reach the packet engine 115 and the edge router 180 at the head end, as well as the remote distribution nodes 131-133 in the fields.

The controller 190 is also for configuring the cable system. Specifically, the controller forwards device configuration data 192 of FIG. 2 or commands to their target devices in the cable system through the control plane messages. In some embodiments, such device configuration commands 192 are generated from a set of cable configuration commands 194 based on a set of normalized data models 198. The normalized data models 198 describe the cable system 100 for the purpose of configuration and control. Device configuration commands 192 are specific to and/or understood by the actual devices implementing the cable system (e.g., the packet engine). Cable configuration commands 194 are general to cable systems and yet references cable specific constructs such CCAP or cable bundles. In some embodiments, the cable configuration commands include syntax referring to the cable system but yet cannot be understood by the packet engine.

An interpreter 195 receives the cable configuration commands 194 and interprets/compiles/transforms the received commands into device configuration 192. To perform the translation from cable configuration commands to device configuration commands, the interpreter 195 consults the set of normalized data models 198. In some embodiments, the interpreter 195 is part of the software running on the controller 190. In some embodiments, the interpreter 195 is provided by another device separate from the controller 190, and the generated device configuration commands 192 are provided to the controller 190, which in turn forwards the device configuration commands to their corresponding destinations. Section II below provides further describes configuration of the virtual CCAP cable system using normalized data models.

II. Configuration using Normalized Data Models

Figure 2:
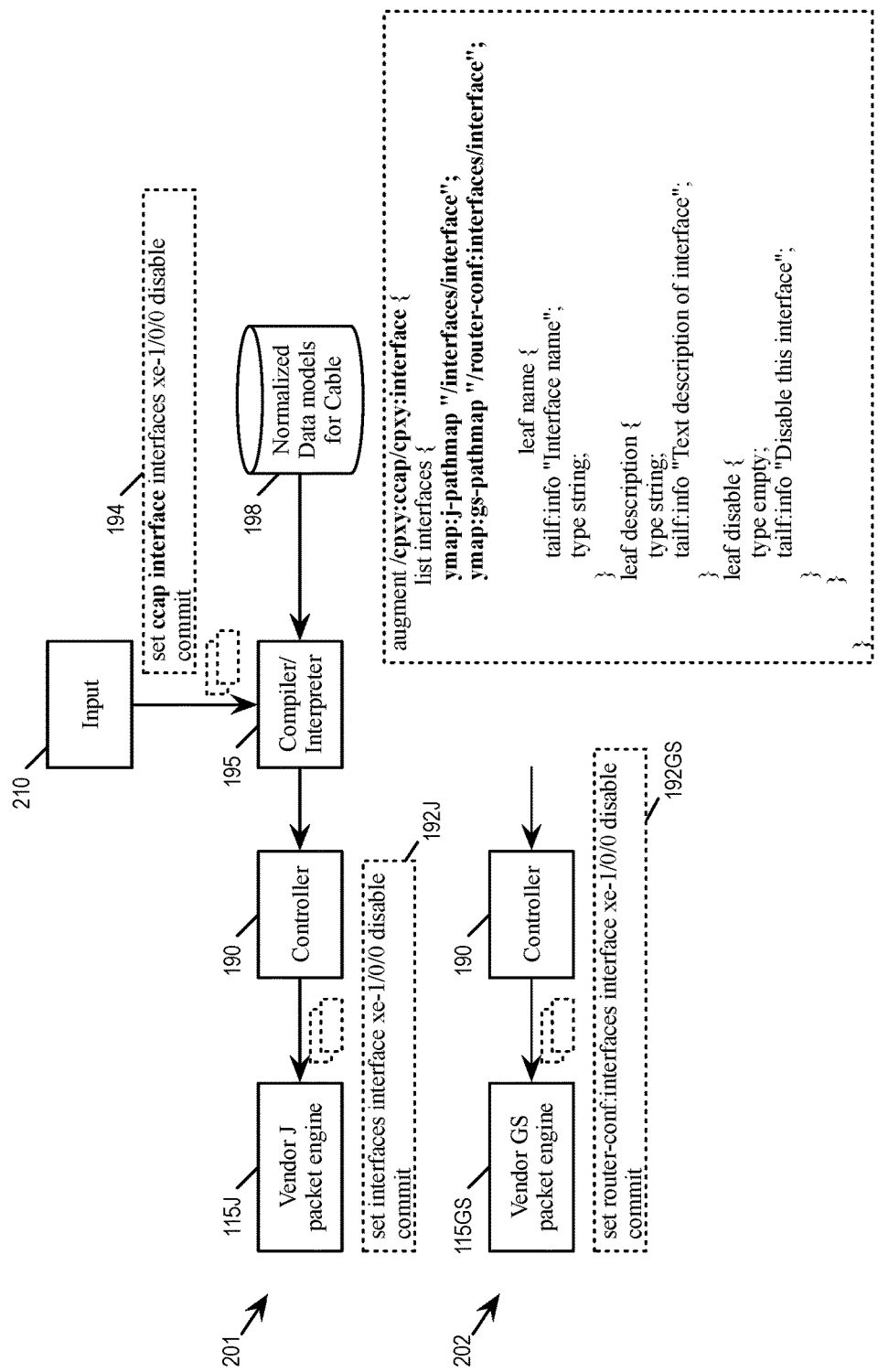
FIG. 2 illustrates an example of using normalized data models to interpret cable configuration commands into device configuration commands.

FIG. 2 illustrates an example of the interpreter 195 using normalized data models 198 of the cable system 100 to interpret/compile/transform cable configuration commands 194 into device configuration commands 192. The cable configuration commands 194 are received from an input 210. In some embodiment, the input 210 is from command line input (CLI). The generated device configuration commands 192 are provided to the controller 190, which in turn forward the configuration commands to the packet engine 115.

As mentioned, the cable head end of the cable system 100 includes the packet engine 115 for processing network traffic of the cable system. The packet engine 115 in some embodiments can be a third party device provided by any number of vendors such as MX™ series router by Juniper™ or 12000™ series router by Cisco™. Packet engine from different vendor often offer entirely different set of resources for use by the cable system, and hence require different configuration data to achieve the same functionality. Even packet engines from a same vendor may go through revisions such that different versions of the machine may require different configuration data. On the other hand, the cable configuration command 194 and the normalized data models 198 are agnostic toward the underlying devices used to implement the cable system. The interpreter 195 therefore maps the cable configuration commands 194 into device configuration commands that are specific to the particular type of packet engine actually used.

FIG. 2 illustrates two different types of the packet engines from two different vendors that can each serve as the packet engine 115 of the cable system 100. In a first scenario 201, a packet engine 115J provided by vendor J is used as the packet engine 115 for the cable system 100. In a second scenario 202, a packet engine 115GS provided by vendor GS is used as the packet engine 115 for the cable system 100. These two packet engines provide different resources that have to be configured differently in order to achieve the same functionality required by the cable system 100. Consequently, in the first scenario 201, the compiler transforms the cable configuration command 194 into a device configuration command 192j for the packet engine 115j, while in the second scenario 202, the compiler transforms the same cable configuration command 194 into a configuration command 192gs for the packet engine 115gs. The configuration command 192j is specifically generated for the packet engine 115j in order for the packet engine to perform exactly as specified by the cable configuration command 194. Likewise, the configuration command 192gs is specifically generated for the packet engine 115gs in order for the packet engine to perform exact as specified by the cable configuration command 194.

In some embodiments, a cable configuration command and the normalized data model for the cable system may include syntax that specifically references components in the cable system. In the example of FIG. 2, the command 194 includes the syntax "set ccap interface". This syntax is specific to the cable system 100 and will not be understood by the packet engine 115 (whether the packet engine 115j or 115gs). The normalized data model 198 on the other hand has corresponding syntax structures "/cpxy:ccap/cpxy:interface" that is used by the compiler 195 to translate the cable configuration command into device configuration commands understood by the actual underlying device.

As mentioned, the normalized data models 198 is normalized to be device-neutral or agnostic and is yet transformed into device-specific configuration commands. In some embodiments, the mapping is made possible by the normalized data models 198 that include transformation or mapping mechanisms for mapping device-neutral or device-agnostic configuration commands into device-specific configuration commands. In this example, the data model 198 includes mapping syntax statements 'ymapj-pathmap "/interfaces/interface"' and 'ymap:gs-pathmap "router-conf:interfaces/interface"' for such transformation. The 'ymap:j-pathmap' syntax is for mapping the "ccap interface" syntax in the cable configuration command 194 into device configuration for the packet engine 115j, while the 'ymap:gs-pathmap' syntax is for mapping the same syntax into device configuration for the packet engine 115gs.

In some embodiments, the cable configuration commands and the normalized data models are for provisioning network services in the cable system. Specifically, cable configuration commands such as 194 are for configuring the cable system to provide network services such as L2 switching, L3 routing, edge routing, DHCP, firewall, etc. These services allows the cable system to operate a IP network, whose data packets used by the cable system to provide cable services such as Set Top Box, Voice over IP, Internet Access, etc. In some embodiments, some or all of the network services are provided by the packet engine or provided through the packet engine, and the cable configuration commands are interpreted into device configuration commands for configuring the packet engine to provide these services.

As mentioned, the normalized data models are for describing the cable system and for describing the network that the cable system is implementing. In some embodiments, the normalized data models include data models for cable constructs such as cable bundles. In some embodiments, the normalized data models include network constructs such as routing protocols (e.g., protocols such as BGP, RIP, etc.).

In some embodiments, the data models are arranged in a hierarchical manner. A data model of a cable construct can be the root of a tree of data models that include data models of network services required to implement cable constructs. For example, a cable bundle is a bundle of cable services (STB, MTA, etc.) that have a set of defined L3 characteristics. Thus the data model for a cable bundle in some embodiments is a hierarchical tree of data models that include data models for the requisite L3 services.

In some embodiments, a service-provisioning request based on hierarchical data models would initiate a hierarchical transaction where the service instance is a parent transaction that fires off child transactions for every device. A provisioning request for a cable system construct based on such normalized data models would thus automatically trigger transactions across the entire hierarchy of the cable system construct. These triggered transactions across the hierarchy in turn generate the corresponding configuration commands.

Figure 3:
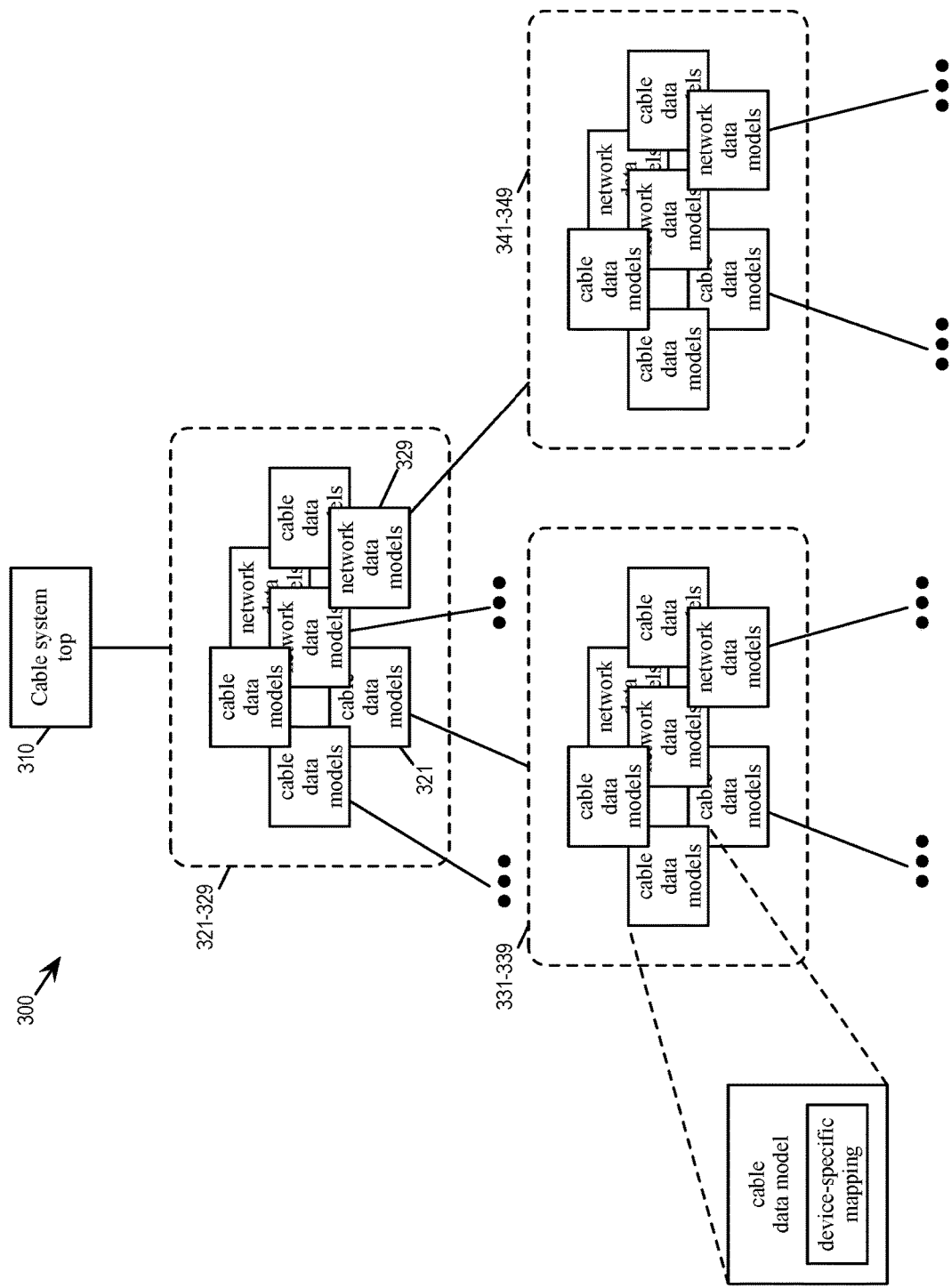
FIG. 3 conceptually illustrates the hierarchical structure of normalized data models for a cable system for some embodiments.

FIG. 3 conceptually illustrates the hierarchical structure 300 of normalized data models for a cable system for some embodiments. The root 310 of the hierarchical structure 300 corresponds to the entirety of the cable system. Beneath of the root 310 are various child data models 321-329, which includes cable data models (for cable system constructs) and/or IP network data models. Some or all of the child cable data models 321-329 in turn have their own child data models, some being cable data models while others are IP network data models. Some or all of these grandchild nodes in turn have their own child nodes, so on and so forth.

In this example, the child node 321 has its own child nodes 331-339. Thus, if a cable configuration command invokes the data model 321, then the data model 331-339 and their offspring data models will also be invoked. In some embodiments, invoking a data model (or a child data model) triggers all transactions/operations specified by the data model. Some of these included transactions are device specific mappings (such as the 'ymapj' and 'ymap:gs' constructs of described above by reference to FIG. 2), and the invocation of these data models causes the generation of the corresponding device-specific configuration commands.

In some embodiments (such as the example of FIG. 2), the normalized data models are written in YANG (Yet Another Next Generation) language. YANG is a data modeling language used to model configuration and state data. The YANG modeling language is a standard defined by the IETF in the NETMOD working group. In YANG, data models are represented by definition hierarchies. Configuration data is structured into a hierarchical tree and the data can be of complex types such as lists and unions. The definitions are contained in modules and one module can augment the tree in another module. A service-provisioning request based on YANG initiates a hierarchical transaction where the service instance is a parent transaction that fires off child transactions for every device.

FIGS. 4a-b illustrates an example normalized YANG 498 (normalized data models written in YANG) for a cable system 400 and a corresponding L3 service-provisioning request. (The normalized YANG 498 is broken into three parts a through c for ease of illustration.) The figure also illustrates cable configuration commands 494, which is interpreted/translated into device configuration commands 492 through the use of the normalized YANG. In some embodiments, the cable configuration commands are entered through command line interface (CLI).

In the example of FIGS. 4a-b (and FIG. 2), the device configuration commands follows the NetConf protocol. NetConf is a configuration management protocol. For some embodiments, NetConf and YANG provide the tools that network administrators need to automate configuration tasks across heterogeneous devices in a software-defined network (SDN). Each YANG module defines a hierarchy of data that can be used for NETCONF-based operations, including configuration, state data, Remote Procedure Calls (RPCs) and notifications. Modules can import data from other external modules and include data from sub-modules.

An interpreter (e.g, 195) translates the cable configuration command 494 into the device configuration commands 492 by using the normalized YANG 498. The device configuration command 492 are communicated from the VCAP controller (e.g., 190 to the packet engine (e.g., 115) over Netconf protocol. The packet engine 115 understands these configuration commands and applies them to its configuration. In this example, the packet engine 115 is from vendor J, and the normalized YANG includes a device mapping syntax 'ymap:j-pathmap "/protocols/igmp/interface{ae0.16383}"' that is used to generate the device configuration command 492 for the vendor J device.

The cable configuration commands 494 are for enabling DOCSIS multicast in the cable system. Specifically, the configuration commands enables IGMP protocol version 3 on the packet engine, with a group-limit of 50, on the interface ae0.16383. This interface is a logical interface created implicitly on the packet-engine towards the ether switch of the cable system (e.g., the packet switch 160). Functionally, when the user enables IGMP on 'cable-bundle-all', it implies IGMP protocol is enabled on all cable-bundles of the cable system, which in the VCAP case for IGMP multicast is represented by ae0.16383 logical interface on the packet engine. IGMP packets are sent out from the packet engine on ae0.16383 towards the ether switch, which forwards these packets to all EtherNodes (ENs) (e.g., remote distribution nodes 131-133). On receiving an IGMP query packet, an EN replies back with (source ID, group ID) information in an IGMP response packet. This facilitates DOCSIS multicast. Whichever cable subscriber is interested in a particular DOCSIS multicast stream, say (Source S1, Group G1), it sends an IGMP join with this source and group information to the EN. The EN then forwards it to the packet engine, which receives it on ae0.16383 interface. The packet engine then knows that there are receivers interested in receiving a particular multicast stream (S1, G1). The packet engine then forwards this information via PIM towards the Edge Router (e.g., 180), which forwards it towards the actual multicast source.

Figure 5:
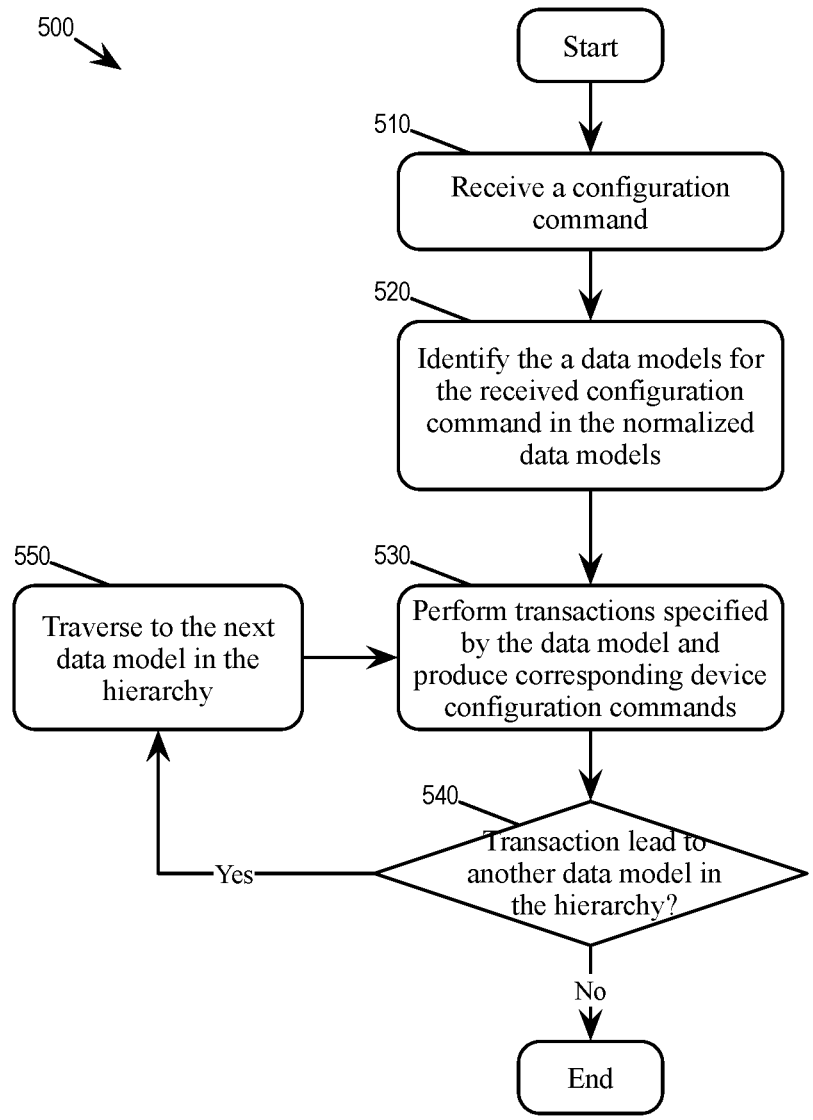
FIG. 5 conceptually illustrates a process for converting cable configuration commands into device-specific configuration commands based on normalized data models describing a cable system.

For some embodiments, FIG. 5 conceptually illustrates a process 500 for converting cable configuration commands into device-specific configuration commands based on normalized data models describing a cable system. In some embodiments, a controller of the cable system such as the VCAP controller 190 performs the process 500. In some embodiments, a complier/interpreter such as the interpreter 195 performs some of the operations of the process, and in some embodiments, the interpreter is a process running on the controller.

The process starts when it receives (at 510) a configuration commands. Such a configuration command may include syntax that refers to constructs of a cable system, constructs such as "CCAP" or "cable bundle". In some embodiments, such cable configuration commands are received over command line interface (CLI).

Next, the process identifies (at 520) a hierarchy of data models for the received configuration command in the normalized data models. In some embodiments, the data models in the normalized data models correspond to constructs/transactions/entities in the cable system, and a cable configuration command can invoke any particular data model. For example, the cable configuration command 194 invokes "ccap interface" data model in the normalized data models 198, and the cable configuration command 494 invokes "ccap protocols" data model in the normalized data model 498.

Next, the process performs (at 530) transactions specified by the data model and produce corresponding device configuration commands (if there are any). Some of these transactions define variables to be used later. Some of these transactions perform mapping to specific devices (such as the "ymap:j" syntax). Some of these transactions invoke other data models in the hierarchy. Some of these transactions produce device configuration commands.

The process then determines (at 540) whether the performed transactions lead to another data model in the hierarchy. If so, the process traverse (550) to the next data model in the hierarchy and performs (at 530) the transactions specified there. Otherwise, the process 500 ends.

III. Debug Tool for Normalized Data Models

Creating the normalized data models, such as the normalized YANG of FIGS. 2 and 4, can be a tedious error-prone process. This is especially true when creating mapping statements that targets a specific path of the target device (such as ymap:j-pathmap "/interfaces/interface", or ymap:j-pathmap "/protocols/igmp/interface{ ae0.16383}"), where hard to detect typos are likely. This error-prone process has to be repeated for each new device that the normalized data models have to prepare for. Erroneous path-mapping would compile into erroneous device configuration commands, which will be rejected by the target device.

Figure 6:
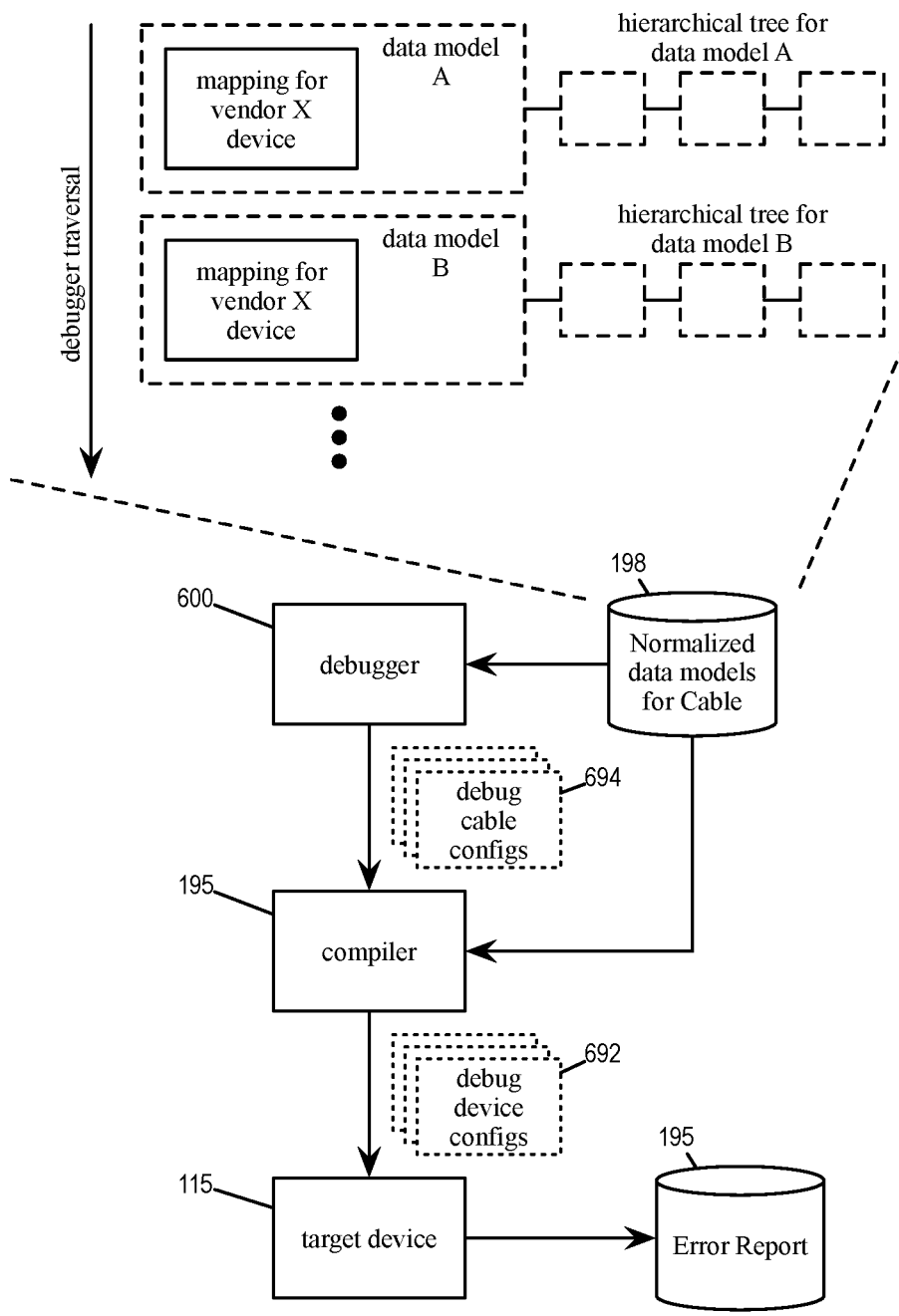
FIG. 6 conceptually illustrates a debugging tool for debugging normalized data models.

Some embodiments therefore provide a debugger tool that automatically exercise the normalized data models and flush the errors that would result in erroneous device configuration commands. FIG. 6 conceptually illustrates a debugging tool 600 for debugging the normalized data models 198. As illustrated, the debugging tool examines the normalized data models 198 and generates debugging cable configuration commands 694 for the compiler 195. In some embodiments, the debugging tool examines the normalized data models to identify transactions that perform specific device mapping (e.g., path mapping syntax such as "ymap:j".) For each of these identified transactions, the debugging tool generates corresponding debug cable configuration commands. These corresponding debug cable configuration commands are to ensure that the device mapping syntax are properly exercised in order to flush out errors.

The compiler 195 in turn compiles/interprets these debug cable configuration commands into debug device configurations 692 for the target device (e.g., the packet engine 115) by using the normalized data models 198. In some embodiments, the compiler would exercise a hierarchy of data models in 198 that are relevant to the device mapping syntax in order to generate the corresponding debug device configuration commands.

The target device 115 receives the debug device configuration commands from the compiler (through the controller 190 and the switch 160) and tries to configure the machine according to the specified path mappings in the debug device configuration commands 692. If the paths specified by the debug device configuration commands have errors, the target device 115 would generate an error report 195, which would aid the programmer in correcting errors in the normalized data models.

Figure 7:
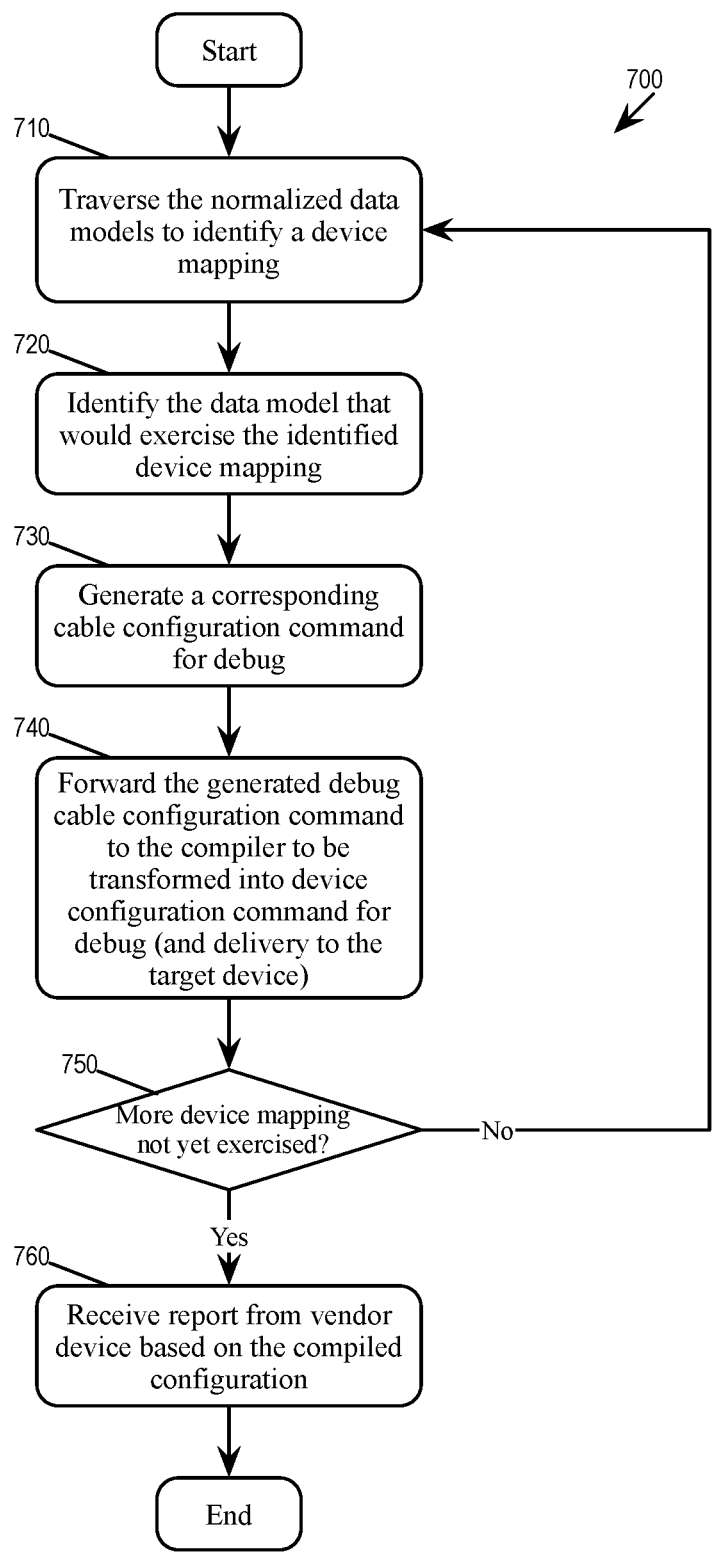
FIG. 7 conceptually illustrates a process for debugging a set of normalized data models.

FIG. 7 conceptually illustrates a process 700 for debugging a set of normalized data models. In some embodiments, the process 700 is performed by a computing device interfacing the controller of the VCAP cable system. The process starts when it is given access to the normalized data models of the cable system. The process traverses (at 710) the normalized data model to identify a device mapping (e.g., a path mapping that refers to a specific device such as the "ymap" syntax".)

Next, the process then identifies (at 720) the data model that would exercise the identified device mapping and generates (at 730) a corresponding cable configuration commands for debug (i.e., the debug cable configuration commands). The process then forwards (at 740) the generated debug cable configuration commands to the compiler to be transformed into device configuration commands for debug. These debug device configuration commands are delivered to the target device (e.g., the packet engine). The delivered debug device configuration commands would then exercise the target device in order to flush out errors in the identified device mapping.

The process then determines (750) if there are any other device mapping syntax in the normalized data models that have not yet been exercised. If so, the process proceeds to 710 generate the corresponding device configuration commands for debug. Otherwise the process proceeds to 760. At 760, the process receives error report from the target device. The error report is presumably generated in response to all of the generated cable configuration commands for debug. The process then ends.

IV. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
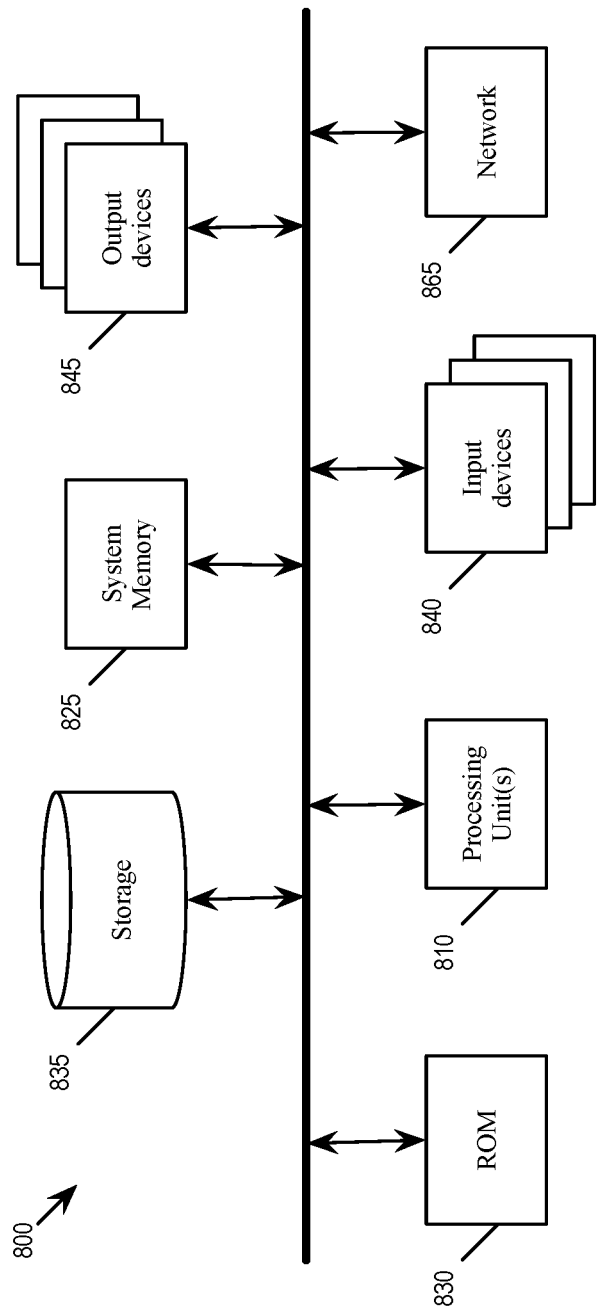
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a cable system, the method comprising:
   receiving a first set of configuration commands for configuring a cable system to provide network services to its subscribers, wherein the cable system employs a packet engine in a cable head end of the cable system for providing the network services and wherein the first set of configuration commands are generalized to the cable system and include syntax referencing the cable system;
   generating by an interpreter in the cable head end of the cable system a second set of configuration commands by interpreting the first set of configuration commands including the syntax referencing the cable system based on a plurality of data models that describe the cable system and the network services to be provided, wherein at least one of the plurality of data models comprises a transaction for mapping a normalized parameter to a set of parameters that are specific to a particular device and vendor of the packet engine; and
   providing the generated second set of configuration commands to the packet engine for configuring the packet engine in the cable head end of the cable system.

2. The method of claim 1, wherein the cable system is a distributed cable management system that comprises the cable head end and a plurality of Ethernodes associated with a MAC address, wherein the cable head end is in digital communication with each of the plurality of Ethernodes using the associated MAC address and in IP communication with an external IP network, wherein the Ethernodes are in RF communication with cable modems over CATV cables, and wherein the first set of configuration commands are generalized to the distributed cable management system and include syntax referencing the distributed cable management system including at least one of: CCAP or cable bundle.

3. The method of claim 1, wherein the cable system further comprises a virtual CCAP controller for delivering the second set of configuration commands to the packet engine.

4. The method of claim 1, wherein the second set of configuration commands includes commands that are specific to a particular device and vendor of the packet engine.

5. The method of claim 1, wherein the packet engine is of a particular device provided by a particular vendor, wherein the method further comprises identifying a transaction for mapping the normalized parameter to the set of parameters for the particular device provided by the particular vendor.

6. The method of claim 1, wherein the at least one of the data models includes a description of a network service and the normalized parameter is applicable to different types of packet engines and further comprising:
   generating the second set of configuration commands specific to the particular device and vendor of the packet engine using the at least one of the data models.

7. The method of claim 2, wherein each of the first set of configuration commands includes syntax specific to the distributed cable management system.

8. The method of claim 7, wherein the syntax specific to the distributed cable management system is not recognizable by the packet engine.

9. The method of claim 1, wherein the set of data models are arranged in a hierarchical tree, wherein a construct in the cable system corresponds to a hierarchy of data models, and wherein the at least one of the plurality of data models is at a first level of the hierarchical tree, the method further comprises:
   determining the transaction for mapping the normalized parameter to the set of parameters that are specific to a particular device and vendor of the packet engine initiates performance of another transaction in at least a second data model in a next level of the hierarchical tree; and
   performing the another transaction in the at least second data model in the next level of the hierarchical tree.

10. A cable system comprising:
    a packet engine and a plurality of Ethernodes, wherein the packet engine is in a head end of the cable system and is in digital communication with the plurality of Ethernodes and in IP communication with an external IP network, wherein the plurality of Ethernodes are located remotely from the head end and are in RF communication with cable modems over CATV cables and in digital communications with the head end in a distributed cable management system;
    a controller in the head end of the cable system for configuring the cable system to provide network services to its subscribers by:
    receiving a first set of cable configuration commands, wherein the first set of cable configuration commands are normalized to the distributed cable management system and include syntax referencing the distributed cable management system;
    generating by an interpreter in the head end a second set of device configuration commands by:
       selecting one of a plurality of sets of data models, wherein the selected data model includes a transaction for mapping a normalized parameter from the first set of cable configuration commands including the syntax referencing the distributed cable management system to a set of parameters that are specific to a device type and vendor of the packet engine in the head end;
       interpreting the first set of cable configuration commands based on the selected data model; and
       providing the generated second set of configuration commands to the packet engine in the head end for configuring the packet engine.

11. The cable system of claim 10, wherein the second set of configuration commands includes commands that are specific to the device type and vendor of the packet engine.

12. The cable system of claim 10, wherein the packet engine is of a particular type of packet engines, wherein the method further comprises identifying a transaction for mapping the normalized parameter including the syntax referencing the distributed cable management system to the set of parameters for the particular type of packet engines.

13. The cable system of claim 10, wherein the first set of cable configuration commands are applicable to the distributed cable management system and are not specific to the device type and vendor of the underlying devices in the distributed cable management system.

14. The cable system of claim 10, wherein the syntax specific to the distributed cable management system is not recognizable by the packet engine.

15. The cable system of claim 10, wherein the set of data models are arranged in a hierarchical tree, wherein a construct in the cable system correspond to a hierarchy of data models, and wherein the selected data model is at a first level of the hierarchical tree and a wherein the transaction performed in the selected data model specifies performance of another transaction in a second data model in a next level of the hierarchical tree.

16. A non-transitory machine-readable storage medium storing a program for configuring a cable system, the computer program comprising sets of instructions that when executed by one or more processors in the cable system, cause the one or more processors to:
  receive a first set of configuration commands for configuring a cable system to provide network services to its subscribers, wherein the cable system employs a packet engine for providing the network services and wherein the first set of configuration commands are generalized to the cable system and include syntax referencing the cable system;
  generate by an interpreter in a cable head end of the cable system a second set of configuration commands by interpreting the first set of configuration commands including the syntax referencing the cable system based on a set of data models that describe the cable system and the network services to be provided, wherein at least one of the data models comprises a transaction for mapping a normalized parameter to a set of parameters that are specific to a particular device and vendor of the packet engine; and
  provide the generated second set of configuration commands to the packet engine for configuring the packet engine.

17. The non-transitory machine-readable storage medium of claim 16, wherein the normalized parameter is applicable to different types of packet engines.

18. The non-transitory machine-readable storage medium of claim 16, wherein the set of data models are arranged in a hierarchical tree, wherein a construct in the cable system correspond to a hierarchy of data models.

19. The non-transitory machine-readable storage medium of claim 16, the computer program further comprising sets of instructions that when executed by the one or more processors in the cable system, cause the one or more processors to:
  process a normalized data model to identify transactions that perform specific device mapping; and
  for each of these identified transactions, generate corresponding debug cable configuration commands.

20. The cable system of claim 15, wherein the construct in the cable system corresponding to the hierarchy of data models includes a cable bundle of cable services that have a set of defined layer 3 characteristics.

21. The cable system of claim 10, wherein the set of data models are arranged in a hierarchical tree, wherein when a cable configuration command invokes a first data model at a first hierarchal level, then additional data models at a next hierarchal level are automatically invoked and transactions specified by the additional data models at the next hierarchal level are performed.

* * * * *